(12) United States Patent
Lee et al.

(10) Patent No.: US 10,662,353 B2
(45) Date of Patent: May 26, 2020

(54) ADHESIVE COMPOSITION FOR OPTICAL MEMBER, OPTICAL MEMBER COMPRISING SAME, AND OPTICAL DISPLAY DEVICE COMPRISING SAME

(71) Applicant: SAMSUNG SDI CO., LTD., Yongin-si, Gyeonggi-do (KR)

(72) Inventors: Seung Jun Lee, Suwon-si (KR); Dong Heon Yun, Suwon-si (KR); Woo Jin Jeong, Suwon-si (KR); Eun Hwan Jeong, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 270 days.

(21) Appl. No.: 15/309,787

(22) PCT Filed: Apr. 6, 2015

(86) PCT No.: PCT/KR2015/003427
§ 371 (c)(1),
(2) Date: Nov. 8, 2016

(87) PCT Pub. No.: WO2016/003057
PCT Pub. Date: Jan. 7, 2016

(65) Prior Publication Data
US 2017/0152414 A1     Jun. 1, 2017

(30) Foreign Application Priority Data
Jun. 30, 2014   (KR) ........................ 10-2014-0081479

(51) Int. Cl.
| | |
|---|---|
| *C09J 133/14* | (2006.01) |
| *C09J 133/06* | (2006.01) |
| *C09J 11/06* | (2006.01) |
| *G02B 5/30* | (2006.01) |
| *G02F 1/1335* | (2006.01) |

(52) U.S. Cl.
CPC .............. *C09J 133/14* (2013.01); *C09J 11/06* (2013.01); *C09J 133/06* (2013.01); *G02B 5/3033* (2013.01); *G02F 1/133528* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 2010/0188620 A1 | 7/2010 | Kim et al. | |
| 2012/0270042 A1* | 10/2012 | Hanai | C09J 133/066 |
| | | | 428/355 AC |
| 2014/0073733 A1 | 3/2014 | Yokokura et al. | |

FOREIGN PATENT DOCUMENTS

| | | | |
|---|---|---|---|
| CN | 103534326 A | | 1/2014 |
| KR | 10-2008-0094282 A | | 10/2008 |
| KR | 10-2009-0012023 A | | 2/2009 |
| KR | 2009-0012023 | * | 2/2009 |
| KR | 10-2013-0013995 A | | 2/2013 |
| KR | 10-1234849 B1 | | 2/2013 |
| KR | 10-2014-0030205 A | | 3/2014 |
| KR | 10-2014-0045787 A | | 4/2014 |
| KR | 2014-0045787 | * | 4/2014 |

OTHER PUBLICATIONS

KR 2014-0045787, Apr. 2014; machine translation.*
KR 2009-0012023, machine translation, Feb. 2009.*
International Search Report for corresponding PCT Application No. PCT/KR2015/003427, dated Jun. 29, 2015, with English Translation (5 pages).
Written Opinion for corresponding PCT Application No. PCT/KR2015/003427, dated Jun. 29, 2015 (7 pages).
Office action in corresponding China Application No. 2015800358616, China Office action dated Jan. 8, 2018 (6 pgs.).

* cited by examiner

*Primary Examiner* — Hui H Chin
(74) *Attorney, Agent, or Firm* — Lewis Roca Rothgerber Christie LLP

(57) ABSTRACT

The present invention relates to an adhesive composition for an optical member, an optical member comprising the same, and an optical display device comprising the same, wherein the composition comprises a (meth)acryl-based copolymer containing an acetoacetoxy group, a metal chelate curing agent, and a tri- or higher functional isocyanate-based curing agent, the (meth)acryl-based copolymer having an acid value of 0 mgKOH/g.

18 Claims, 1 Drawing Sheet

【FIG. 1】
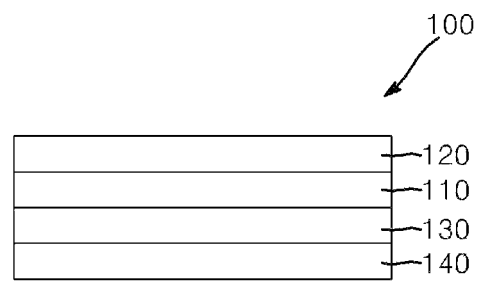
【FIG. 2】
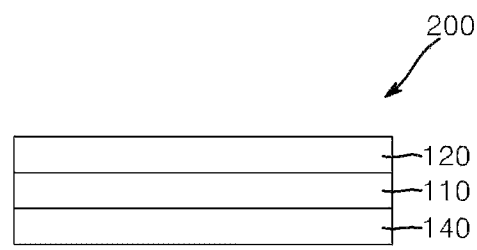
【FIG. 3】
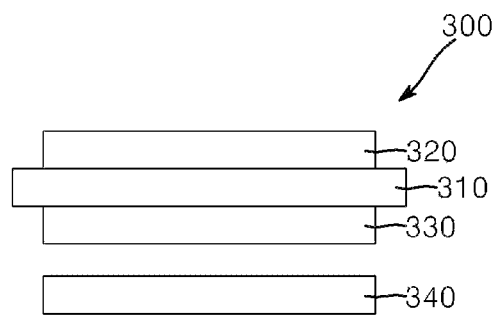

ADHESIVE COMPOSITION FOR OPTICAL MEMBER, OPTICAL MEMBER COMPRISING SAME, AND OPTICAL DISPLAY DEVICE COMPRISING SAME

CROSS-REFERENCE TO RELATED APPLICATIONS

This application is a National Phase Patent Application and claims priority to and the benefit of International Application Number PCT/KR2015/003427, filed on Apr. 6, 2015, which claims priority to and the benefit of Korean Patent Application No. 10-2014-0081479, filed on Jun. 30, 2014, the entire contents of each of which are incorporated herein by reference.

BACKGROUND

1. Field

Aspects of embodiments of the present invention relate to an adhesive composition for optical members, an optical member including the same, and an optical display device including the same.

2. Description of the Related Art

A liquid crystal display includes a liquid crystal panel and polarizing plates attached to both surfaces of the liquid crystal panel, and each of the polarizing plates include a polarizer and a protective film formed on one or both surfaces of the polarizer to protect the polarizer. The polarizing plate is attached to the liquid crystal panel via an adhesive film for polarizing plates, which is formed of an adhesive composition for polarizing plates.

Generally, the adhesive composition for polarizing plates includes an adhesive resin and a curing agent. An adhesive resin free from a carboxylic acid group can extend the aging duration of the adhesive composition, thereby reducing productivity. However, the adhesive composition including an adhesive resin containing a carboxylic acid group can cause a problem of corrosion or damage to a panel. Recently, application of the adhesive resin free from the carboxylic acid group has expanded in order to prevent corrosion of the panel by an acid. Therefore, there is a need for an adhesive composition that has a short aging duration even without containing the carboxylic acid group. Furthermore, the adhesive composition is required to have good properties in terms of thermal resistance and moist heat resistance in order to prevent deformation of the polarizing plate caused by shrinkage or expansion of the polarizer. On the other hand, upon cutting a stack structure of a polarizing plate/adhesive film/release film using a knife and the like, the adhesive film exhibiting low adhesion to the polarizing plate can be adhered to the knife, thereby deteriorating processability. Moreover, if the adhesive film exhibits lower adhesion to the polarizing plate than to the panel, there can be a problem of reworkability, and bubbles or failure may occur between the polarizing plate and the adhesive film under severe environments.

The background technique of the present invention is disclosed in Korean Patent Publication No. 2008-0094282 A.

SUMMARY

According to an aspect of embodiments of the present invention, an adhesive composition for optical members includes an adhesive resin free from a carboxylic acid group while securing short aging duration.

According to another aspect of embodiments of the present invention, an adhesive composition for optical members exhibits good adhesion to a polarizing plate, thereby providing good reworkability and processability.

According to another aspect of embodiments of the present invention, an adhesive composition for optical members exhibits good properties in terms of thermal resistance and moist heat resistance.

The above and other aspects of the present invention can be achieved by one or more embodiments of the present invention.

In accordance with one or more embodiments of the present invention, an adhesive composition for optical members includes: a (meth)acrylic copolymer containing an acetoacetoxy group; a metal chelate curing agent; and a tri- or higher functional isocyanate curing agent, wherein the (meth)acrylic copolymer has an acid value of 0 mg KOH/g.

In accordance with one or more embodiments of the present invention, an adhesive composition for optical members includes: a (meth)acrylic copolymer; a metal chelate curing agent; and a tri- or higher functional isocyanate curing agent, wherein a gel fraction difference is about 5% or less, as calculated by the following Equation 1, and the (meth)acrylic copolymer has an acid value of 0 mg KOH/g:

$$\text{Gel fraction difference} = GF7 - GF1, \qquad \text{<Equation 1>}$$

where, in Equation 1, GF7 is a gel fraction after aging for 7 days as calculated by the following Equation 2, and GF1 is a gel fraction after aging for 1 day as calculated by the following Equation 2:

$$\text{Gel fraction} = (WC - WA)/(WB - WA) \times 100, \qquad \text{<Equation 2>}$$

where, in Equation 2, WA is a weight of a wire mesh, WB is a total weight of the wire mesh and a specimen of an adhesive film placed on the wire mesh, in which the specimen is obtained by depositing 1.0 g of the adhesive composition to a thickness of 20 μm on a release film, followed by aging at 35° C. and 45% RH (relative humidity) for 1 day or for 7 days, respectively, and WC is a total weight of the wire mesh and the adhesive film, which have been placed in a sample bottle, left for 1 day after adding 50 cc of ethyl acetate thereto, and then dried at 100° C. for 12 hours.

In accordance with one or more embodiments of the present invention, an optical member may include the above-described adhesive film formed of the adhesive composition for optical members.

In accordance with one or more embodiments of the present invention, an optical display device may include the above-described optical member.

According to an aspect of embodiments of the present invention, an adhesive composition for optical members includes an adhesive resin free from a carboxylic acid group while securing short aging duration. According to another aspect of embodiments of the present invention, an adhesive composition for optical members exhibits good adhesion to a polarizing plate, thereby providing good reworkability and processability. According to another aspect of embodiments of the present invention, an adhesive composition for optical members exhibits good properties in terms of thermal resistance and moisture resistance.

BRIEF DESCRIPTION OF THE DRAWINGS

FIG. 1 is a cross-sectional view of a polarizing plate according to an embodiment of the present invention.

FIG. 2 is a cross-sectional view of a polarizing plate according to another embodiment of the present invention.

FIG. 3 is a cross-sectional view of a liquid crystal display according to another embodiment of the present invention.

DETAILED DESCRIPTION

Some embodiments of the present invention will be described in further detail with reference to the accompanying drawings to provide a thorough understanding of the invention to those skilled in the art. It should be understood that the present invention may be embodied in different ways and is not limited to the following embodiments. In the drawings, portions irrelevant to the description will be omitted for clarity, and like components will be denoted by like reference numerals throughout the specification.

As used herein, the term "(meth)acryl" refers to acryl and/or methacryl, "(meth)acrylate" refers to acrylate and/or methacrylate, and spatially relative terms such as "upper" and "lower" are defined with reference to the accompanying drawings and thus it will be understood that "upper surface" can be used interchangeably with "lower surface."

An adhesive composition for optical members according to an embodiment of the present invention will be described.

The adhesive composition for optical members according to an embodiment of the present invention is used to attach an optical member (for example: a polarizing plate, a retardation plate, a brightness enhancing plate, or anti-glare sheet) to a substrate (for example: a glass plate or a liquid crystal panel), and includes a (meth)acrylic copolymer containing an acetoacetoxy group, a metal chelate curing agent, and a tri- or higher functional isocyanate curing agent, wherein the (meth)acrylic copolymer has an acid value of 0 mg KOH/g.

An adhesive composition including a (meth)acrylic copolymer free from a carboxylic acid group requires long aging duration, thereby deteriorating productivity. Although the adhesive composition according to an embodiment of the present invention is free from the carboxylic acid group and thus has an acid value of 0 mg KOH/g, the adhesive composition according to an embodiment of the present invention includes the (meth)acrylic copolymer containing an acetoacetoxy group and the metal chelate curing agent, whereby reaction between the (meth)acrylic copolymer and the metal chelate curing agent can be significantly improved, thereby reducing aging duration of the adhesive composition.

In addition to the (meth)acrylic copolymer containing an acetoacetoxy group and the metal chelate curing agent, the adhesive composition further includes the tri- or higher functional isocyanate curing agent in order to achieve further reduction in aging duration and to ensure that an adhesive film formed of the adhesive composition has a ratio of substrate adhesive strength to peel strength (substrate adhesive strength/peel strength) in the range of about 3 to about 15, for example, about 3 to about 10, thereby improving processability and reworkability upon cutting a stack structure of an optical member/adhesive film/release film using a knife or the like. As used herein, "peel strength" means a force for peeling the adhesive film from a glass plate, "substrate adhesive strength" means a force for peeling the adhesive film from an optical member, and "optical member" can mean a polarizing plate, a retardation plate, a brightness enhancing plate, an anti-glare sheet, or the like.

A monomer mixture for the (meth)acrylic copolymer may include about 1 wt % or more of an acetoacetoxy group-containing monomer, for example, about 1 wt % to about 10 wt %, or as another example, about 1 wt % to about 5 wt % in the monomer mixture. Within this range of the monomer mixture, aging duration of the adhesive composition can be reduced even in the case where the copolymer does not include the carboxylic acid group, and the adhesive film formed of the adhesive composition has a ratio of substrate adhesive strength to peel strength in the range of about 3 to about 15, thereby improving processability and reworkability of an optical member.

The acetoacetoxy group-containing monomer is a (meth)acrylic monomer having an acetoacetoxy group, for example, a $C_1$ to $C_{10}$ alkyl group-containing (meth)acrylate having an acetoacetoxy group, without being limited thereto. Specifically, the acetoacetoxy group-containing monomer may include acetoacetoxyethyl (meth)acrylate, acetoacetoxypropyl (meth)acrylate, acetoacetoxybutyl (meth)acrylate, and mixtures thereof.

The monomer mixture may include at least one of an alkyl group-containing (meth)acrylic monomer, a hydroxyl group-containing (meth)acrylic monomer, an alicyclic group-containing (meth)acrylic monomer, and a heteroalicyclic group-containing (meth)acrylic monomer. Preferably, the adhesive composition further includes a mixture of the alkyl group-containing (meth)acrylic monomer and the hydroxyl group-containing (meth)acrylic monomer in order to improve substrate adhesive strength of the adhesive film.

The alkyl group-containing (meth)acrylic monomer serves to improve reliability of the adhesive film for optical members, and may include a linear or branched unsubstituted $C_1$ to $C_{20}$ alkyl group-containing (meth)acrylic ester. For example, the alkyl group-containing (meth)acrylic monomer may include at least one selected from the group consisting of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, dodecyl (meth)acrylate, and a combination thereof, without being limited thereto. The alkyl group-containing (meth)acrylic monomer may be present in an amount of about 80 wt % to about 98 wt %, for example, about 90 wt % to about 98 wt % in the monomer mixture. Within this range of the alkyl group-containing (meth)acrylic monomer, the adhesive composition can improve adhesive strength of the adhesive composition.

The hydroxyl group-containing (meth)acrylic monomer may be a $C_2$ to $C_{20}$ alkyl group, $C_5$ to $C_{20}$ cycloalkyl group or $C_6$ to $C_{20}$ aryl group-containing (meth)acrylic ester having a hydroxyl group at a terminal thereof or in the structure thereof. For example, the hydroxyl group-containing (meth)acrylic monomer may include at least one selected from the group consisting of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-penyloxypropyl(meth)acrylate, 4-hydroxycyclopentyl(meth)acrylate, 4-hydroxycyclohexyl (meth)acrylate, cyclohexanedimethanol mono(meth)acrylate, and a combination thereof, without being limited thereto. The hydroxyl group-containing (meth)acrylic monomer may be present in an amount of about 0.1 wt % to about 10 wt %, for example, about 0.5 wt % to about 5 wt % in the monomer mixture. Within this range of the hydroxyl group-containing (meth)acrylic monomer, the adhesive composition can improve substrate adhesive strength and adhesive strength of the adhesive film.

The alicyclic group-containing (meth)acrylic monomer is a saturated $C_3$ to $C_{10}$ alicyclic group-containing (meth)acrylic monomer and may include isobornyl (meth)acrylate and the like. The alicyclic group-containing (meth)acrylic monomer may be optionally present in an amount of about 0 wt % to about 10 wt %, for example, about 0 wt % to about 5 wt %, in the monomer mixture. Within this range of the alicyclic group-containing (meth)acrylic monomer, the adhesive composition can improve substrate adhesive strength and adhesive strength of the adhesive film.

The hetero-alicyclic group-containing (meth)acrylic monomer may be a (meth)acrylic monomer containing a $C_2$ to $C_{10}$ aliphatic or alicyclic saturated or unsaturated hetero-ring or $C_4$ to $C_{20}$ aromatic hetero-ring having a hetero atom (for example, at least one of nitrogen (N), oxygen (O) and sulfur (S)). For example, the hetero-alicyclic group-containing (meth)acrylic monomer may include (meth)acryloyl-morpholine. The heteroalicyclic group-containing (meth)acrylic monomer may be optionally present in an amount of about 0 wt % to about 10 wt %, for example, about 0 wt % to about 5 wt %, in the monomer mixture. Within this range of the hetero-alicyclic group-containing (meth)acrylic monomer, the adhesive composition can improve substrate adhesive strength and adhesive strength of the adhesive film.

In one embodiment, the monomer mixture may include about 80 to about 98 wt % of the alkyl group-containing (meth)acrylic monomer, about 0.1 to about 10 wt % of the hydroxyl group-containing (meth)acrylic monomer, and about 1 to about 10 wt % of the acetoacetoxy group-containing monomer in the monomer mixture. Within this range of the monomer mixture, the adhesive composition can improve durability, substrate adhesive strength, and adhesive strength of the adhesive film.

The (meth)acrylic copolymer may have a weight average molecular weight (Mw) of about 1,500,000 g/mol or less, for example, about 500,000 g/mol to about 1,200,000 g/mol, or as another example, about 800,000 g/mol to about 1,200,000 g/mol. Within this range, the adhesive film can exhibit good adhesive strength, suppress light leakage, and provide good durability. The weight average molecular weight may be obtained by gel permeation chromatography using polystyrene standards. The (meth)acrylic copolymer may have a glass transition temperature of about −43° C. to about −25° C., preferably about −43° C. to about −35° C. Within this range, the (meth)acrylic copolymer can improve durability of the adhesive film. The (meth)acrylic copolymer may have a polydispersion index of about 1 to about 10, preferably about 3 to about 7. Within this range, the (meth)acrylic copolymer can secure durability of the adhesive film. The (meth)acrylic copolymer may have a viscosity at 25° C. of about 2,000 cPs to about 8,000 cPs, and, in one embodiment, about 3,500 cPs to about 5,000 cPs. Within this range, the (meth)acrylic copolymer can secure coatability of the adhesive composition.

The (meth)acrylic copolymer may be prepared by adding an initiator to the monomer mixture, followed by typical copolymerization, for example, suspension polymerization, emulsion polymerization, solution polymerization, and the like. Polymerization may be performed at about 65° C. to about 70° C. for about 6 to 8 hours. The initiator may be a typical initiator including azo-based initiators such as azobisisobutyronitrile or azobiscyclohexanecarbonitirle, and/or peroxides such as benzoyl peroxide or acetyl peroxide.

The metal chelate curing agent reacts with the acetoacetoxy group of the (meth)acrylic copolymer to increase the crosslinking rate. The metal chelate curing agent may be a typical curing agent, which includes a metal, such as aluminum, titanium, iron, copper, zinc, tin, titanium, nickel, antimony, magnesium, vanadium, chromium, and/or zirconium. For example, the metal chelate curing agent may include at least one selected from among aluminum ethyl acetoacetate diisopropylate, aluminum tris(ethyl acetoacetate), alkyl acetoacetate aluminum diisopropylate, aluminum isopropylate, mono-sec-butoxy aluminum diisopropylate, aluminum-sec-butylate, aluminum ethylate, tetraisopropyl titanate, tetranormalbutyl titanate, butyl titanate dimers, titan acetylacetonate, titan octyleneglycolate, titan tetraacetylacetonate, titan ethylacetoacetate, and polyhydroxy titan stearate. Particularly, for the adhesive composition including the metal chelate curing agent having an acetylacetonate group, the acetylacetonate group can be volatilized from the curing agent upon drying of the adhesive film formed of the adhesive composition, and the acetoacetoxy group coupled to the (meth)acrylic copolymer can bind to the metal in the curing agent to increase the curing rate, thereby further improving productivity through reduction in aging duration of the adhesive film.

In the adhesive composition, the metal chelate curing agent may be present in an amount of about 0.01 parts by weight to about 5 parts by weight, for example, about 0.05 parts by weight to about 1 part by weight, relative to 100 parts by weight of the (meth)acrylic copolymer. Within this range, the metal chelate curing agent can reduce aging duration of the adhesive film while improving durability of the adhesive film.

The tri- or higher functional isocyanate curing agent means a curing agent having three or more isocyanate groups. Preferably, the isocyanate curing agent may include a tri- to hexafunctional isocyanate curing agent having three to six isocyanate groups.

The tri- or higher functional isocyanate curing agent reacts with the hydroxyl group of the (meth)acrylic copolymer to increase the crosslinking rate and improves substrate adhesive strength, thereby increasing the ratio of substrate adhesive strength to peel strength of the adhesive film while improving reliability of the adhesive film. The tri- or higher functional isocyanate curing agent may include trifunctional isocyanate curing agents including a trifunctional trimethylolpropane-modified toluene diisocyanate adduct, a trifunctional toluene diisocyanate trimer, and a trimethylolpropane-modified xylene diisocyanate adduct, and hexafunctional isocyanate curing agents including a hexafunctional trimethylolpropane-modified toluene diisocyanate, and a hexafunctional isocyanurate-modified toluene diisocyanate. Preferably, the tri- or higher functional isocyanate curing agent is a trifunctional isocyanate curing agent having an aromatic group and an isocyanate group, and may be a compound represented by Formula 1. In an embodiment, a toluene diisocyanate trimer may be used and Coronate-2030 (Nippon Polyurethane) may be used as a commercially available product.

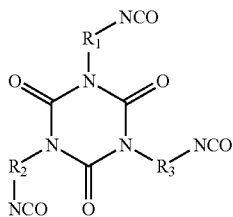
<Formula 1> where, in Formula 1, $R_1$, $R_2$ and $R_3$ are each independently a substituted or unsubstituted $C_6$ to $C_{10}$ aromatic hydrocarbon.

In Formula 1, "aromatic hydrocarbon" means an arylene group and "substituted" means that at least one hydrogen atom of the aromatic hydrocarbon is substituted with a $C_1$ to $C_5$ alkyl group.

In the adhesive composition, the isocyanate curing agent may be present in an amount of about 0.01 parts by weight to about 5 parts by weight, for example, about 0.05 parts by weight to about 1 part by weight, relative to 100 parts by weight of the (meth)acrylic copolymer. Within this range, the isocyanate curing agent can reduce aging duration of the adhesive film while improving substrate adhesive strength and durability of the adhesive film.

The adhesive composition further includes a silane coupling agent to improve adhesive strength with respect to a glass plate and the like. The silane coupling agent may be a typical silane coupling agent. For example, the silane coupling agent may include at least one selected from the group consisting of epoxy structure-containing silicon compounds such as 3-glycidoxypropyltrimethoxysilane, 3-glycidoxypropylmethyldimethoxysilane, and 2-(3,4-epoxycyclohexyl)ethyl trimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto. In an embodiment, a silane coupling agent having an epoxy structure is used.

The silane coupling agent may be present in an amount of about 0.1 parts by weight to about 5 parts by weight, and, in one embodiment, about 0.1 parts by weight to about 1 part by weight, relative to 100 parts by weight of the (meth) acrylic copolymer. Within this range of the silane coupling agent, the adhesive composition can exhibit good durability and suffer from less variation in components and properties over time.

The adhesive composition may have a viscosity at 25° C. of about 1,000 cPs to about 4,000 cPs. Within this range, the adhesive composition allows easy adjustment in thickness of the adhesive film, can prevent formation of spots on the adhesive film, and can form a uniform coating.

In one embodiment, the adhesive composition includes a (meth)acrylic copolymer; a metal chelate curing agent; and a tri- or higher functional isocyanate curing agent, wherein a gel fraction difference as calculated by the following Equation 1 is about 5% or less, for example, about 0.1% to about 5%, and the (meth)acrylic copolymer has an acid value of 0 mg KOH/g:

Gel fraction difference=GF7−GF1, <Equation 1> where, in Equation 1, GF7 is a gel fraction after aging for 7 days as calculated by Equation 2, and GF1 is a gel fraction after aging for 1 day as calculated by Equation 2:

Gel fraction=(WC−WA)/(WB−WA)×100, <Equation 2> where, in Equation 2, WA is a weight of a wire mesh, WB is a total weight of the wire mesh and a specimen of an adhesive film placed on the wire mesh, in which the specimen is obtained by depositing 1.0 g of the adhesive composition to a thickness of 20 μm on a release film, followed by aging at 35° C. and 45% RH (relative humidity) for 1 day or for 7 days, and WC is a total weight of the wire mesh and the adhesive film, which have been placed in a sample bottle, left for 1 day after adding 50 cc of ethyl acetate thereto, and then dried at 100° C. for 12 hours. That is, the gel fraction after aging for 1 day means a gel fraction measured after curing the adhesive film for 1 day, and the gel fraction after aging for 7 days means a gel fraction measured after aging the adhesive film for 7 days.

Within the above range of the gel fraction difference, the adhesive film can be obtained through short aging duration, thereby improving productivity. The gel fraction after aging for 1 day may be in the range of about 70% to about 90% and the gel fraction after aging for 7 days may be in the range of about 75% to about 99%. Within these ranges of gel fractions, the adhesive film can be obtained through short aging duration, thereby improving productivity.

The (meth)acrylic copolymer, the metal chelate curing agent and the tri- or higher functional isocyanate curing agent are the same as those described above.

The adhesive film can be produced using the adhesive composition according to one or more embodiments of the invention. As a result, the adhesive film may have an index of adhesion of about 3 to about 15, for example, about 3 to about 10, as calculated by Equation 3. Within this range, the adhesive film can exhibit improved processability and reworkability upon cutting a stack structure of an optical member/adhesive film/release film using a knife or the like.

Index of adhesion=substrate adhesive strength/peel strength, <Equation 3> where, in Equation 3, substrate adhesive strength is 180° peel strength between the adhesive film and a polarizing plate in accordance with ASTM D3330, and peel strength is 180° peel strength between the adhesive film and a glass plate in accordance with ASTM D3330.

As described in Equation 3, the peel strength of the adhesive film is measured with respect to a glass plate or a release film in accordance with ASTM D3330 and may range from about 0.2 kgf/25 mm to about 1.0 kgf/25 mm, and the substrate adhesive strength thereof is measured with respect to an optical member in accordance with ASTM D3330 and may range from about 1.0 kgf/25 mm to about 3.0 kgf/25 mm. Within this range, the adhesive film exhibits improved properties in terms of processability upon cutting, reworkability, and durability.

The adhesive film may be produced by coating the adhesive composition to a thickness (e.g., a predetermined thickness), followed by drying and aging at about 25° C. to about 35° C., and may have a thickness of about 5 μm to about 100 μm, for example, about 10 μm to about 50 μm. Within this thickness range, the adhesive film can be used in an optical display device.

An optical member according to an embodiment of the present invention may include an adhesive film for optical members formed of the adhesive composition for optical members according to an embodiment of the invention.

Herein, the term "optical member" may mean a polarizing plate, a retardation plate, a brightness enhancing plate, or an anti-glare sheet, without being limited thereto. The optical member may be produced by attaching the adhesive film for optical members to one or both surfaces of the optical member or by coating the adhesive composition to a predetermined thickness on one or both surfaces of the optical member, followed by aging.

In an embodiment, the optical member may be a polarizing plate including the adhesive film according to the embodiment of the present invention. The polarizing plate may be a polarizer, an optical film formed on at least one surface of the polarizer, and an adhesive film formed on at least one surface of the optical film, wherein the adhesive film may include the adhesive film for optical members according to the embodiments of the present invention.

FIG. 1 is a cross-sectional view of a polarizing plate according to an embodiment of the present invention. Referring to FIG. 1, a polarizing plate 100 according to an embodiment of the present invention includes a polarizer 110, a first optical film 120 formed on an upper surface of the polarizer 110, a second optical film 130 formed on a lower surface of the polarizer 110, and an adhesive film 140 formed on a lower surface of the second optical film 130, and the adhesive film 140 may include the adhesive film according to an embodiment of the present invention. FIG. 2 is a cross-sectional view of a polarizing plate according to another embodiment of the present invention. Referring to FIG. 2, a polarizing plate 200 according to another embodiment of the present invention includes a polarizer 110, a first optical film 120 formed on an upper surface of the polarizer 110, and an adhesive film 140 formed on a lower surface of the polarizer 110, and the adhesive film 140 may include the adhesive film according to an embodiment of the present invention.

The polarizer 110 is produced using any polyvinyl alcohol film by any method without limitation. For example, the polarizer may be a modified polyvinyl alcohol film such as a partially formalized polyvinyl alcohol film, an acetoacetyl group-modified polyvinyl alcohol film, or the like. In an embodiment, the polarizer is produced by dyeing a polyvinyl alcohol film with iodine or dichroic dyes, followed by stretching the polyvinyl alcohol film in a certain direction. In an embodiment, the polarizer is produced through swelling, dyeing, and stretching processes. A method of performing each of these processes is generally known to those skilled in the art.

The polarizer 110 may have a thickness of, for example, about 10 µm to about 50 µm, without being limited thereto. Within this range, the polarizer 110 can be used in an optical display device.

The first optical film 120 and the second optical film 130 may be the same or different, and may include cyclic polyolefin including amorphous cyclic olefin polymer (COP) and the like, poly(meth)acrylates, polycarbonates, polyester including polyethylene terephthalate (PET) and the like, polyethersulfone, polysulfone, polyimide, polyimide, polyolefin, polyarylate, polyvinyl alcohol, polyvinyl chloride, polyvinylidene chloride resins, or a mixture thereof.

Each of the first optical film 120 and the second optical film 130 may have a thickness of about 10 µm to about 200 µm, for example, about 30 µm to about 120 µm, without being limited thereto. Within this thickness range, the first and second optical films can be used in an optical display device.

Although not shown in FIG. 1 and FIG. 2, bonding layers formed of a bonding agent for polarizing plates may be interposed between the polarizer and the first optical film and between the polarizer and the second optical film. The bonding agent for polarizing plates may include water-based, pressure-sensitive, and UV curable bonding agents.

An optical display device according to an embodiment of the present invention may include the optical member according to an embodiment of the present invention. For example, the optical display may include liquid crystal displays and organic light emitting displays, without being limited thereto.

FIG. 3 is a cross-sectional view of a liquid crystal display according to another embodiment of the present invention. Referring to FIG. 3, a liquid crystal display 300 according to an embodiment may include a liquid crystal display panel 310, a first polarizing plate 320 formed on an upper surface of the liquid crystal display panel 310, a second polarizing plate 330 formed on a lower surface of the liquid crystal display panel 310, and a backlight unit 340 disposed under the second polarizing plate 330, and at least one of the first and second polarizing plates 320 and 330 may include the polarizing plate according to an embodiment of the present invention.

Next, an embodiment of the present invention will be described in more detail with reference to some examples. It should be understood that these examples are provided for illustration only and are not to be construed in any way as limiting the invention.

Preparation Example 1: Preparation of (Meth)Acrylic Copolymer

In a 1 L reactor provided with a cooler to facilitate temperature adjustment while purging with nitrogen, a monomer mixture was prepared by mixing 98 parts by weight of n-butyl acrylate (BA), 1 part by weight of 2-hydroxyethyl acrylate (2-HEA), and 1 part by weight of acetoacetoxyethyl methacrylate (AAEM), followed by adding 100 parts by weight of ethyl acetate (EA) as a solvent. The reactor was purged with nitrogen gas for 1 hour in order to remove oxygen from the reactor and then was maintained at 65° C. The monomer mixture was uniformly stirred, followed by adding 0.07 parts by weight of azobisisobutyronitrile (AIBN) as an initiator to the reactor, and then subjected to reaction for 8 hours, thereby preparing an acrylic copolymer having a weight average molecular weight of 800,000 g/mol to 1,200,000 g/mol and an acid value of 0 mg KOH/g.

*Method of Measuring Acid Value of (Meth)Acrylic Copolymer

About 1 g of a (meth)acrylic copolymer was dissolved in 20 ml of toluene followed by titration with 0.1N KOH solution using a phenolphthalein solution as an indicator until the mixture exhibited a bright red color for 30 seconds. Then, the acid value was calculated by the following Equation:

$$\text{Acid value} = 5.611 \times F \times (V-B)/S,$$

V: Suitable amount of 0.1N KOH solution for titration of sample solution (ml);
B: Suitable amount of 0.1N KOH solution for titration of blank (ml);
F: Threshold value of 0.1N KOH solution;
S: Weight of sample solution [g].

Preparation Examples 2 to 3: Preparation of (Meth)Acrylic Copolymer

Acrylic copolymers B and C were prepared by the same method as in Example 1 except for compositional ratios as listed in Table 1 (unit: parts by weight).

TABLE 1

|  |  | [Preparation Example 1] A | [Preparation Example 2] B | [Preparation Example 3] C |
|---|---|---|---|---|
| Monomer | BA | 98 | 94 | 99 |
|  | 2-HEA | 1 | 1 | 1 |
|  | AAEM | 1 | 5 | — |
| Acid value (mg KOH/g) |  | 0 | 0 | 0 |

Example 1

In terms of solid content, 100 parts by weight of the acrylic copolymer prepared in Preparation Example 1, 0.1 parts by weight of aluminum acetylacetonate (Aldrich) as a metal chelate curing agent, 0.5 parts by weight of a trifunctional isocyanate curing agent having an isocyanurate group (Coronate-2030, Nippon Polyurethane), 0.5 parts by weight of 3-glycidoxypropyltrimethoxysilane (KMB-403, Shin-Etsu Chemical Co., Ltd.) as a silane coupling agent were mixed. The mixture was diluted to a concentration of 20 wt % in terms of solid content, and stirred for 30 minutes, thereby preparing an adhesive composition.

The adhesive composition was coated onto a polyethylene terephthalate release film and dried at 100° C. for 4 minutes to form a 20 μm thick adhesive layer.

A polarizer was prepared by stretching a polyvinyl alcohol film to three times an initial length thereof in an aqueous iodine solution at 60° C., followed by further stretching the film to 2.5 times in an aqueous boric acid solution at 40° C. As protective films, TAC films (N-TAC, Konica Co., Ltd., thickness: 40 μm) were attached to upper and lower surfaces of the polarizer via a bonding agent (Z-200, Nippon Goshei Co., Ltd.), thereby preparing a polarizing plate. The adhesive layer was attached to one side of the protective film and left under constant temperature and constant humidity conditions (35° C., 45% RH).

Examples 2 to 6

Adhesive compositions, adhesive layers, and polarizing plates were prepared by the same method as in Example 1 except that the kinds and amounts of the (meth)acrylic copolymer, the metal chelate curing agent, and the isocyanate curing agent were changed as listed in Table 2 (unit: parts by weight).

Comparative Examples 1 to 4

Adhesive compositions, adhesive layers, and polarizing plates were prepared by the same method as in Example 1 except that the components of the adhesive composition were changed as listed in Table 2.

TABLE 2

|  |  | Example |  |  |  |  |  | Comparative Example |  |  |  |
|---|---|---|---|---|---|---|---|---|---|---|---|
| Item |  | 1 | 2 | 3 | 4 | 5 | 6 | 1 | 2 | 3 | 4 |
| (Meth)acrylic copolymer | Kind | A | A | A | A | A | B | A | A | A | C |
|  | Parts by weight | 100 | 100 | 100 | 100 | 100 | 100 | 100 | 100 | 100 | 100 |
| Metal chelate curing agent |  | 0.1 | 0.05 | 0.5 | 0.1 | 0.1 | 0.1 | — | 1.0 | 0.1 | 0.1 |
| Isocyanate curing agent 1 |  | 0.5 | 0.5 | 0.5 | 0.1 | 1.0 | 0.5 | 0.5 | — | — | 0.5 |
| Isocyanate curing agent 2 |  | — | — | — | — | — | — | — | — | 0.5 | — |
| Silane coupling agent |  | 0.5 | 0.5 | 0.5 | 0.5 | 0.5 | 0.5 | 0.5 | 0.5 | 0.5 | 0.5 |

Isocyanate curing agent 1: Coronate-2030 (Nippon Polyurethane)
Isocyanate curing agent 2: D101 (Asahi Kasei, bifunctional isocyanate curing agent)

The adhesive compositions, the adhesive layers and the polarizing plates of Examples and Comparative Examples were evaluated as to peel strength, substrate adhesive strength, gel fraction, reliability and processability by the following evaluation methods, and results are shown in Table 3.

(1) Peel strength (adhesive strength, kgf/25 mm): 180° peel strength between an adhesive film and a glass plate was measured in accordance with ASTM D3330. A 20 μm thick adhesive layer was formed by coating and drying an adhesive composition at 100° C., and left under constant temperature/humidity conditions of 35° C. and 45% RH for 1 day, thereby preparing a specimen. The specimen was cut into a size of 25 mm×200 mm (length×width) and attached to a glass plate. With the adhesive film and the glass plate coupled to upper and lower jigs of a tensile tester (texture analyzer), peel strength was measured under a 30 kgf load cell by peeling the adhesive film from the glass plate at a peeling angle of 180° and at a tensile speed of 300 mm/min.

(2) Substrate adhesive strength (kgf/25 mm): 180° peel strength between an adhesive film and a polarizing plate was measured in accordance with ASTM D3330. A 20 μm thick adhesive layer was formed by coating an adhesive composition and drying the adhesive composition at 100° C., and attached to a polarizing plate fabricated by the method as set forth in Example 1. A specimen was prepared by leaving the adhesive layer under constant temperature/humidity conditions of 35° C. and 45% RH for 1 day. The specimen was cut into a size of 25 mm×200 mm (length×width). With the adhesive film and the polarizing plate coupled to upper and lower jigs of a tensile tester (texture analyzer), peel strength was measured under a 30 kgf load cell by peeling the adhesive film from the polarizing plate at a peeling angle of 180° and at a tensile speed of 300 mm/min.

(3) Gel fraction (%): Gel fraction was calculated by the following Equation 1 and a gel fraction difference was evaluated:

Gel fraction difference=GF7−GF1,    <Equation 1> where, in Equation 1, GF7 is a gel fraction after aging for 7 days as calculated by Equation 2, and GF1 is a gel fraction after aging for 1 day as calculated by Equation 2.

Gel fraction=(WC−WA)/(WB−WA)×100    <Equation 2> where, in Equation 2, WA is a weight of a wire mesh, WB is a total weight of the wire mesh and a specimen of an adhesive film placed on the wire mesh, in which the specimen is obtained by depositing 1.0 g of the adhesive composition to a thickness of 20 μm on a release film, followed by aging at 35° C. and 45% RH (relative humidity) for 1 day or for 7 days, and WC is a total weight of the wire mesh and the adhesive film, which have been placed in a sample bottle, left for 1 day after adding 50 cc of ethyl acetate thereto, and then dried at 100° C. for 12 hours. That is, the gel fraction after aging for 1 day means a gel fraction measured after curing the adhesive film for 1 day, and the gel fraction after aging for 7 days means a gel fraction measured after aging the adhesive film for 7 days.

A gel fraction difference between a gel fraction after aging for 1 day and a gel fraction after aging for 7 days was obtained. A polyethylene terephthalate film (thickness: 38 μm) was used as the release film, a 100 mL wide mount bottle was used as the sample bottle, and a 200 mesh iron net was used.

(4) Reliability: Specimens were prepared by attaching polarizing plates (100 mm×80 mm, length×width), on which each of the adhesive compositions of Examples and Comparative Examples was coated, to both surfaces of a glass plate, followed by compressing the polarizing plates under a pressure of 4 to 5 kg/cm². The specimens were left at 85° C. for 250 hours, followed by evaluation as to thermal resistance based on generation of bubbles or delamination. Moisture/thermal resistance reliability was evaluated based on generation of bubbles or delamination after leaving the specimens under conditions of 60° C. and 95% RH for 250 hours. Evaluation criteria were as follows.

○: Neither bubbling nor delamination
Δ: Slight bubbling or delamination
x: Significant bubbling or delamination (5) Processability: Specimens were prepared by cutting a polarizing plate, on which each of the adhesive compositions of Examples and Comparative Examples was coated, into a size of 100 mm×5 mm (length×width) 20 times or more. After preparation of the specimens, a cut plane of each of the specimens was observed through a microscope to determine whether the adhesive layer was adhered to the cut plane of the specimen. Evaluation criteria were as follows.

○: No problem on cutting planes of 18 or more specimens
Δ: Slight disappearance of adhesive layer from cut planes of 10 to 17 specimens
x: Disappearance of adhesive layer from cut plane of less than 10 specimens

TABLE 3

|  | Example | | | | | | Comparative Example | | | |
|---|---|---|---|---|---|---|---|---|---|---|
|  | 1 | 2 | 3 | 4 | 5 | 6 | 1 | 2 | 3 | 4 |
| Peel strength (kgf/25 mm) | 0.42 | 0.63 | 0.28 | 0.47 | 0.22 | 0.53 | 0.73 | 0.32 | 0.43 | 0.83 |
| Substrate adhesive strength (kgf/25 mm) | 1.7 | 1.9 | 1.4 | 1.5 | 2.2 | 1.8 | 2.1 | 0.7 | 1.3 | 2.0 |
| Index of adhesion (substrate adhesive strength/peel strength) | 4.0 | 3.0 | 5.0 | 3.1 | 10 | 3.4 | 2.9 | 2.2 | 3.0 | 2.4 |
| Gel fraction after aging for 1 day (%) | 85 | 73 | 89 | 77 | 88 | 86 | 52 | 69 | 66 | 42 |
| Gel fraction after aging for 7 days (%) | 87 | 76 | 91 | 81 | 92 | 87 | 76 | 72 | 75 | 72 |
| Gel fraction difference (%) | 2 | 3 | 2 | 4 | 4 | 1 | 24 | 3 | 9 | 30 |
| Moisture resistance reliability | ○ | ○ | ○ | ○ | ○ | ○ | Δ | x | ○ | Δ |
| Thermal resistance reliability | ○ | ○ | ○ | ○ | ○ | ○ | Δ | x | ○ | x |
| Processability | ○ | ○ | ○ | ○ | ○ | ○ | Δ | x | ○ | x |

As shown in Table 3, the adhesive compositions according to the present invention had a significantly low difference between a gel fraction after aging for 1 day and a gel fraction after aging for 7 days, despite the presence of the (meth)acrylic copolymer free from the carboxylic acid group. Further, the adhesive composition according to the present invention had a ratio of substrate adhesive strength to peel strength in the range of 3 to 15, thereby providing good processability of an adhesive film while securing good moisture resistance reliability and thermal resistance reliability.

Conversely, the adhesive composition of Comparative Example 1, which was prepared without using a metal chelate curing agent, exhibited poor durability and required long aging duration; the adhesive composition of Comparative Example 2, which was prepared without using a tri- or higher functional isocyanate curing agent, required short aging duration and had problems of low substrate adhesive strength and poor durability, the adhesive composition of Comparative Example 3, which was prepared without using a bifunctional isocyanate curing agent, required long aging duration; and the adhesive composition of Comparative Example 4, which was prepared using a (meth)acrylic copolymer free from an acetoacetoxy group, required long aging duration and had poor durability.

From these results, it can be seen that, even in the presence of an adhesive resin free from a carboxylic acid group, the adhesive composition according to the present invention can significantly reduce aging duration and exhibits good adhesion with respect to a polarizing plate, thereby securing good properties in terms of reworkability, processability, thermal resistance reliability, and moisture resistance reliability.

It should be understood that various modifications, changes, alterations, and equivalent embodiments can be made by those skilled in the art without departing from the spirit and scope of the invention.

The invention claimed is:

1. An adhesive composition for optical members, comprising:
   a (meth)acrylic copolymer comprising both an acetoacetoxy group and a hydroxyl group;
   a metal chelate curing agent; and
   a tri- or higher functional isocyanate curing agent,
   wherein the (meth)acrylic copolymer has an acid value of 0 mg KOH/g, and
   the tri- or higher functional isocyanate curing agent is greater than or equal to the metal chelate curing agent in amount.

2. The adhesive composition for optical members according to claim 1, wherein the (meth)acrylic copolymer containing the acetoacetoxy group is a copolymer of a monomer mixture comprising about 1 wt % or more of an acetoacetoxy group-containing monomer in the monomer mixture.

3. The adhesive composition for optical members according to claim 2, wherein the acetoacetoxy group-containing monomer is present in an amount of about 1 wt % to about 10 wt % in the monomer mixture.

4. The adhesive composition for optical members according to claim 2, wherein the monomer mixture comprises the acetoacetoxy group-containing monomer, an alkyl group-containing (meth)acrylic monomer, and a hydroxyl group-containing (meth)acrylic monomer.

5. The adhesive composition for optical members according to claim 1, wherein the metal chelate curing agent comprises an acetylacetonate group.

6. The adhesive composition for optical members according to claim 1, wherein the metal chelate curing agent is present in an amount of about 0.01 parts by weight to about 1 part by weight relative to 100 parts by weight of the (meth)acrylic copolymer.

7. The adhesive composition for optical members according to claim 1, wherein the tri- or higher functional isocyanate curing agent comprises at least one of a trifunctional trimethylolpropane-modified toluene diisocyanate adduct, a trifunctional toluene diisocyanate trimer, a trimethylolpropane-modified xylene diisocyanate adduct, a hexafunctional trimethylolpropane-modified toluene diisocyanate, and a hexafunctional isocyanurate-modified toluene diisocyanate.

8. The adhesive composition for optical members according to claim 1, wherein the tri- or higher functional isocyanate curing agent comprises a trifunctional isocyanate curing agent having an isocyanurate group.

9. The adhesive composition for optical members according to claim 1, wherein the tri- or higher functional isocyanate curing agent is present in an amount of about 0.01 parts by weight to about 5 parts by weight relative to 100 parts by weight of the (meth)acrylic copolymer.

10. The adhesive composition for optical members according to claim 1, further comprising: a silane coupling agent.

11. An adhesive composition for optical members, comprising:
    a (meth)acrylic copolymer comprising both an acetoacetoxy group and a hydroxyl group;
    a metal chelate curing agent; and
    a tri- or higher functional isocyanate curing agent,
    wherein a gel fraction difference is about 5% or less, as calculated by the following Equation 1, and the (meth)acrylic copolymer has an acid value of 0 mg KOH/g:

$$\text{Gel fraction difference} = GF7 - GF1, \quad \text{<Equation 1>}$$

where GF7 is a gel fraction after aging for 7 days as calculated by the following Equation 2, and GF1 is a gel fraction after aging for 1 day as calculated by the following Equation 2:

$$\text{Gel fraction} = ((WC - WA)/(WB - WA)) \times 100, \quad \text{<Equation 2>}$$

where WA is a weight of a wire mesh,
WB is a total weight of the wire mesh and a specimen of an adhesive film placed on the wire mesh, in which the specimen is obtained by depositing 1.0 g of the adhesive composition to a thickness of 20 μm on a release film, followed by aging at 35° C. and 45% RH (relative humidity) for 1 day or for 7 days, respectively, and
WC is a total weight of the wire mesh and the adhesive film, which have been placed in a sample bottle, left for 1 day after adding 50 cc of ethyl acetate thereto, and then dried at 100° C. for 12 hours.

12. The adhesive composition for optical members according to claim 11, wherein the adhesive film formed of the adhesive composition has an index of adhesion of about 3 to about 15, as calculated by Equation 3:

$$\text{Index of adhesion} = \text{substrate adhesive strength/peel strength}, \quad \text{<Equation 3>}$$

where substrate adhesive strength is 180° peel strength between the adhesive film and a polarizing plate in accordance with ASTM D3330, and peel strength is 180° peel strength between the adhesive film and a glass plate in accordance with ASTM D3330.

13. The adhesive composition for optical members according to claim 11, wherein the (meth)acrylic copolymer is a copolymer of a monomer mixture comprising about 1 wt % to about 10 wt % of an acetoacetoxy group-containing monomer in the monomer mixture.

14. The adhesive composition for optical members according to claim 11, wherein the (meth)acrylic copolymer comprises a copolymer of a monomer mixture comprising an acetoacetoxy group-containing monomer, an alkyl group-containing (meth)acrylic monomer, and a hydroxyl group-containing (meth)acrylic monomer.

15. The adhesive composition for optical members according to claim 11, wherein the tri- or higher functional isocyanate curing agent comprises at least one of a trifunctional trimethylolpropane-modified toluene diisocyanate adduct, a trifunctional toluene diisocyanate trimer, a trimethylolpropane-modified xylene diisocyanate adduct, a hexafunctional trimethylolpropane-modified toluene diisocyanate, and a hexafunctional isocyanurate-modified toluene diisocyanate.

16. An optical member comprising an adhesive film formed of the adhesive composition for optical members according to claim 1.

17. The optical member according to claim 16, wherein the optical member comprises a polarizing plate.

18. An optical display device comprising the optical member according to claim 16.

* * * * *